April 7, 1925.
J. C. TURNER
1,532,962
FLYWHEEL FOR TOYS
Filed Nov. 27, 1922
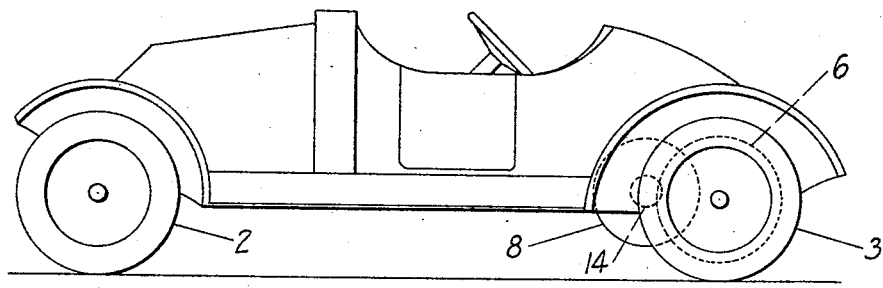
Fig. 1
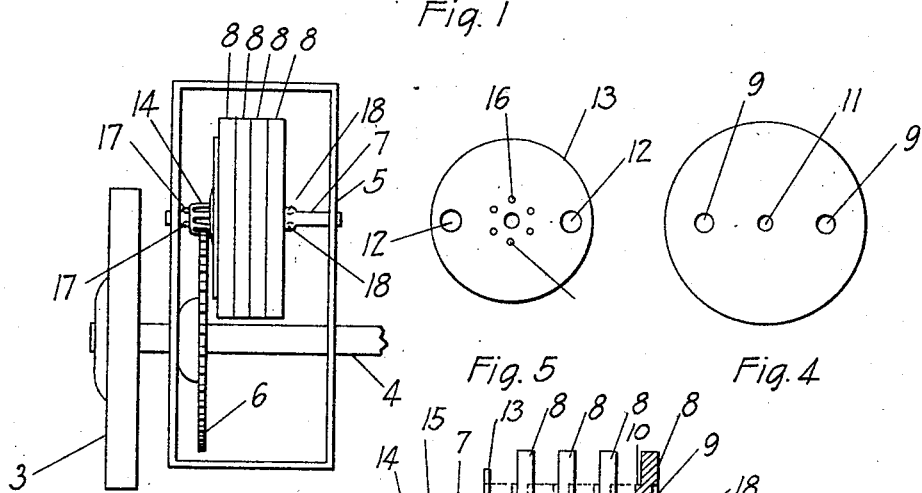
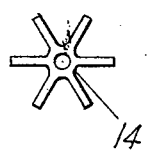
Fig. 6
INVENTOR,
John C. Turner,
BY Howard S. Smith.
His ATTORNEY Patented Apr. 7, 1925.

1,532,962

UNITED STATES PATENT OFFICE.

JOHN C. TURNER, OF DAYTON, OHIO.

FLYWHEEL FOR TOYS.

Application filed November 27, 1922. Serial No. 603,454.

*To all whom it may concern:*

Be it known that I, JOHN C. TURNER, a citizen of the United States, residing at Dayton, in the county of Montgomery and State of Ohio, have invented certain new and useful Improvements in Flywheels for Toys, of which the following is a specification.

This invention relates to new and useful improvements in fly wheels for toys, and has particular reference to a fly wheel of the laminated type.

One of the principal objects of my invention is to provide a laminated fly wheel which may be economically manufactured and which will have a true balance on the spindle. Cast iron wheels are often irregularly formed, with the result that they have to be drilled to balance them on the spindle. My improved fly wheel, on the other hand, is compoosed of a series of discs which are balanced punchings that are made absolutely alike by the dies. These discs are adapted to be fitted together, face to face, to provide a laminated fly wheel that has a true balance on the spindle, and to which it need not be tightly connected as in the case of other fly wheels.

It is another object of my invention to provide a pinion which is adapted to be slipped over the spindle for a firm and easy connection to the fly wheel through the medium of a secondary disc that is itself a punching which is easily applied to one face of the fly wheel. The pinion is formed to fit into the secondary disc in such an easy manner as to make the latter a cheap and efficient medium for attaching the pinion to the fly wheel.

Other important and incidental objects will be brought out in the following specification, and particularly set forth in the subjoined claims.

In the accompanying drawings, Figure 1 is a side elevational view of an automobile toy equipped with my new fly wheel and pinion construction. Figure 2 is a plan view of the sub-frame containing my improved fly wheel and pinion construction. Figure 3 is a side view of the fly wheel and pinion construction mounted on the spindle, with the rear disc in section; the fly wheel discs, the secondary disc and the pinion being spaced a sufficient distance from each other to show how they are fitted together. Figure 4 is a plan view of one of the discs of the laminated fly wheel, showing the lugs on one face of the disc. Figure 5 is a plan view of the dished secondary disc, showing the apertures into which the prongs on the pinion project. And Figure 6 is a plan view of the pinion after it has been punched out in spider form.

Throughout the specification and drawings, similar reference characters denote corresponding parts.

Referring to the accompanying drawings for a detailed description of the form of embodiment of my invention illustrated in the accompanying drawings, the numeral 1 designates a toy constructed to represent an automobile mounted on ground wheels 2 and 3. One of the wheels 3 is shown in Figure 2 as fast on an axle shaft 4 journaled in a sub-frame 5.

Fast on the shaft 4 within the sub-frame 5 is a gear 6 which is adapted to be driven by my improved fly wheel and pinion construction now to be described. While I have embodied the latter in the toy illustrated and described, it may be employed in any other structure without departing from the invention.

Loosely mounted on a spindle 7 secured within the sub-frame 5, is a series of discs 8 which, while they are shown to be four in number, may be of any less or greater number if desired. Each disc 8 is preferably a punching which is formed by a die to provide two circular or other shaped depressions 9, 9 in one face and two lugs 10, 10 on its other face in line with the depressions. However, I do not wish to be limited to the number or location of these lugs and depressions, for they may be varied if desired. Each of the discs 8 is formed with a central hole 11 through which the spindle 7 is adapted to freely project to support them in alinement with each other. (See Figures 2, 3 and 4.)

The discs 8 are adapted to be pressed together along the spindle so that the lugs 10, 10 on each disc will enter the depressions 9, 9 in the adjacent disc, with the exception that the lugs on the innermost disc are adapted to project through holes 12, 12 in a secondary disc 13 which is mounted on the spindle 7 for a purpose now to be described. (See Figures 2, 3 and 5.)

Referring to Figures 2, 3 and 6, the numeral 14 designates a pinion which is mounted on the spindle 7 for engagement with the gear 6, and is constructed as follows for attachment to the secondary disc 13 to turn the fly wheel through the medium of the latter when the gear 6 is rotated. As shown in Figure 6, this pinion 14 is a punching having a central hole and a series of radial prongs 15 with kinked outer ends. After the pinion has been stamped out in the form of a spider, the prongs 15 are turned or bent to form axial projections for entrance into a circular row of apertures 16 in the secondary disc 13. The latter is also a punching which has a dished central portion in which the apertures 16 are formed.

The disc 13 is so mounted on the spindle 7 that its dished apertured portion will face the pinion 14 to enable the prongs 15 of the latter to be deeply projected into it. The pinion 14 is held against outward movement by projections 17, 17 on the spindle, and the secondary disc 13 is in turn held against the innermost disc 8 by the kinked ends of the prongs 15 of the pinion. Projections 18, 18 on the spindle assist the prongs 17, 17 in holding the entire fly wheel unit in a compact position on it.

It is thus seen that my laminated fly wheel and pinion construction, being made in separate parts from punchings, conduces to economy in manufacture and ease of assembly. The fly wheel has a true balance, and the pinion is connected to it in a simple and efficient manner.

I do not wish to be limited to the details of construction and arrangement herein shown and described, and any changes or modifications may be made therein within the scope of the claims.

Having described my invention, I claim:

1. In a device of the type described, the combination with a spindle, of a fly wheel mounted thereon, and having apertures in one outer part thereof, and a pinion having radial projections that are turned for entrance into the apertures in said outer part of the fly wheel structure to connect it to the latter.

2. In a device of the type described, the combination with a spindle, of a fly wheel mounted thereon, a connecting member applied to one face of the fly wheel and having apertures therein, and a pinion mounted on the spindle, said pinion having radial projections that are turned for entrance into the apertures to connect it to the fly wheel structure.

3. In a device of the type described, the combination with a fly wheel structure mounted thereon and having apertures in one outer part thereof, and a pinion which is a punching having radial projections with kinked ends, that are turned for entrance into the apertures of the fly wheel structure to connect it to the latter.

4. In a device of the type described, the combination with a spindle, of a fly wheel mounted thereon having projections on one outer face, a disc mounted on said spindle containing holes to receive said projections, and also having an outwardly faced, dished portion containing apertures, and a pinion mounted on the spindle, said pinion having radial prongs that are turned for entrance into the holes in the dished portion of the disc for the purpose specified.

In testimony whereof I have hereunto set my hand this 14th day of November, 1922.

JOHN C. TURNER.

Witness:
HOWARD S. SMITH.